US012236880B2

(12) United States Patent
Li et al.

(10) Patent No.: US 12,236,880 B2
(45) Date of Patent: Feb. 25, 2025

(54) PIXEL DRIVING CIRCUIT, DISPLAY PANEL AND METHOD FOR MANUFACTURING SAME, AND DISPLAY DEVICE

(71) Applicant: BOE Technology Group Co., Ltd., Beijing (CN)

(72) Inventors: Ran Li, Beijing (CN); Xueyan Tian, Beijing (CN); Hongwei Tian, Beijing (CN); Tuo Sun, Beijing (CN); Xiyu Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/578,656

(22) PCT Filed: May 23, 2023

(86) PCT No.: PCT/CN2023/095670

§ 371 (c)(1),
(2) Date: Jan. 11, 2024

(87) PCT Pub. No.: WO2023/236770

PCT Pub. Date: Dec. 14, 2023

(65) Prior Publication Data

US 2024/0339077 A1 Oct. 10, 2024

(30) Foreign Application Priority Data

Jun. 9, 2022 (CN) ......................... 202210649930.4

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
None
See application file for complete search history.

(56) References Cited

U.S. PATENT DOCUMENTS

2004/0066146 A1* 4/2004 Park .................... G09G 3/3233 315/169.3
2004/0233140 A1* 11/2004 Jo ......................... H10K 59/84 345/82

(Continued)

FOREIGN PATENT DOCUMENTS

CN 1427385 A 7/2003
CN 1490778 A 4/2004

(Continued)

OTHER PUBLICATIONS

CN-116844473-A merged image (Year: 2023).*
CN-111785211-A merged image (Year: 2023).*

*Primary Examiner* — Dorothy Harris
(74) *Attorney, Agent, or Firm* — IPro, PLLC

(57) ABSTRACT

A pixel driving circuit is provided. The pixel driving circuit includes a light emission control circuit and a drive circuit. The light emission control circuit controls a potential of a control terminal of the drive circuit under the control of a coupled signal terminal, and the drive circuit drives a coupled light-emitting element to emit light based on the potential of the control terminal thereof. The drive circuit includes two drive transistors connected in parallel, and subthreshold swings of the two drive transistors are different.

20 Claims, 8 Drawing Sheets

(52) U.S. Cl.
CPC ............... *G09G 2300/0842* (2013.01); *G09G 2300/0861* (2013.01); *G09G 2320/0233* (2013.01); *G09G 2320/045* (2013.01)

(56) References Cited

U.S. PATENT DOCUMENTS

| | | | | |
|---|---|---|---|---|
| 2006/0114192 | A1 | 6/2006 | Kasai | |
| 2007/0080905 | A1 | 4/2007 | Takahara | |
| 2007/0200802 | A1* | 8/2007 | Kasai | G09G 3/3241<br>345/76 |
| 2016/0276352 | A1 | 9/2016 | Morimoto et al. | |
| 2018/0182292 | A1* | 6/2018 | Zhu | G09G 3/3233 |
| 2020/0302860 | A1* | 9/2020 | Kim | G09G 3/3258 |
| 2021/0027709 | A1* | 1/2021 | Nishiyama | G09G 3/3233 |
| 2021/0233468 | A1 | 7/2021 | Toyomura | |
| 2022/0392402 | A1 | 12/2022 | Ueda et al. | |
| 2023/0133704 | A1* | 5/2023 | Gai | G09G 3/20<br>345/691 |
| 2024/0119897 | A1 | 4/2024 | Zhang et al. | |

FOREIGN PATENT DOCUMENTS

| | | | | | |
|---|---|---|---|---|---|
| CN | 1820295 | A | | 8/2006 | |
| CN | 102903719 | A | | 1/2013 | |
| CN | 106531076 | A | | 3/2017 | |
| CN | 107195629 | A | | 9/2017 | |
| CN | 111785211 | A | * | 10/2020 | G09G 3/3233 |
| CN | 114222615 | A | | 3/2022 | |
| CN | 114586092 | A | | 6/2022 | |
| CN | 116844473 | A | * | 10/2023 | |

* cited by examiner

PIXEL DRIVING CIRCUIT, DISPLAY PANEL AND METHOD FOR MANUFACTURING SAME, AND DISPLAY DEVICE

CROSS-REFERENCE TO RELATED APPLICATION

This application is a U.S. national stage of international application No. PCT/CN2023/095670, filed on May 23, 2023, which claims priority to Chinese Patent Application No. 202210649930.4, filed Jun. 9, 2022 and entitled "PIXEL DRIVING CIRCUIT, DISPLAY PANEL AND METHOD FOR MANUFACTURING SAME, AND DISPLAY DEVICE", the disclosures of which are herein incorporated by reference in their entireties.

TECHNICAL FIELD

The present disclosure generally relates to the field of display technologies, and in particular, to a pixel driving circuit, a display panel and a method for manufacturing the same, and a display device.

BACKGROUND

An organic light-emitting diode (OLED) display panel can use an oxide transistor as its drive transistor.

SUMMARY

The present disclosure provides a pixel driving circuit, a display panel and a method for manufacturing the same, and a display device. The technical solutions are as follows.

In an aspect, a pixel driving circuit is provided. The pixel driving circuit includes: a light emission control circuit and a drive circuit; wherein the light emission control circuit is coupled to a gate signal terminal, a data signal terminal, a reset signal terminal, an initial power supply terminal, and a control terminal of the drive circuit, and the light emission control circuit is configured to control a potential of the control terminal of the drive circuit based on a gate driving signal provided by the gate signal terminal, a data signal provided by the data signal terminal, a reset signal provided by the reset signal terminal, and an initial power supply signal provided by the initial power supply terminal;

an output terminal of the drive circuit is configured to be coupled to a light-emitting element, and the drive circuit is configured to transmit a light emission driving signal to the light-emitting element based on the potential of the control terminal of the drive circuit, to drive the light-emitting element to emit light;

wherein the drive circuit includes a first drive transistor and a second drive transistor connected in parallel; and a subthreshold swing of one of the first drive transistor and the second drive transistor is greater than a subthreshold swing of the other one of first drive transistor and the second drive transistor.

In some embodiments, a gate of the first drive transistor acts as the control terminal of the drive circuit and is coupled to the light emission control circuit, and a gate of the second drive transistor is coupled to the gate of the first drive transistor; and the subthreshold swing of the first drive transistor is greater than the subthreshold swing of the second drive transistor.

In some embodiments, the light emission control circuit includes: a first reset sub-circuit, a data writing sub-circuit and a compensation control sub-circuit; wherein the first reset sub-circuit is coupled to the reset signal terminal, the initial power supply terminal, and the control terminal of the drive circuit, and the first reset sub-circuit is configured to control connection or disconnection between the initial power supply terminal and the control terminal of the drive circuit in response to the reset signal;

the data writing sub-circuit is coupled to the gate signal terminal, the data signal terminal, and an input terminal of the drive circuit, and the data writing sub-circuit is configured to control connection or disconnection between the data signal terminal and the input terminal of the drive circuit in response to the gate driving signal; and the compensation control sub-circuit is coupled to the gate signal terminal, the output terminal of the drive circuit, and the control terminal of the drive circuit, and the compensation control sub-circuit is configured to control connection or disconnection between the output terminal of the drive circuit and the control terminal of the drive circuit in response to the gate driving signal.

In some embodiments, the light emission control circuit further includes: a first light emission control sub-circuit, a second light emission control sub-circuit, a second reset sub-circuit and a storage sub-circuit; wherein the first light emission control sub-circuit is coupled to a light emission control terminal, a driving power supply terminal, and the input terminal of the drive circuit, and the first light emission control sub-circuit is configured to control connection or disconnection between the driving power supply terminal and the input terminal of the drive circuit in response to a light emission control signal provided by the light emission control terminal;

the second light emission control sub-circuit is coupled to the light emission control terminal and the output terminal of the drive circuit and is configured to be coupled to the light-emitting element, and the second light emission control sub-circuit is configured to control connection or disconnection between the output terminal of the drive circuit and the light-emitting element in response to the light emission control signal;

the second reset sub-circuit is coupled to the reset signal terminal and the initial power supply terminal and is configured to be coupled to the light-emitting element, and the second reset sub-circuit is configured to control connection or disconnection between the initial power supply terminal and the light-emitting element in response to the reset signal; and the storage sub-circuit is coupled to the driving power supply terminal and the control terminal of the drive circuit, and the storage sub-circuit is configured to store the potential of the control terminal of the drive circuit based on the driving power supply signal.

In some embodiments, the first reset sub-circuit includes: a first reset transistor; the second reset sub-circuit includes: a second reset transistor; the data writing sub-circuit includes: a data writing transistor; the compensation control sub-circuit includes: a compensation transistor; the first light emission control sub-circuit includes: a first light emission control transistor; the second light emission control sub-circuit includes: a second light emission control transistor; and the storage sub-circuit includes: a storage capacitor; wherein a gate of the first reset transistor and a gate of the second reset transistor are coupled to the reset signal terminal, a first electrode of the first reset transistor and a first electrode of the second reset transistor are coupled to the initial power supply terminal, a second electrode of the first reset transistor is coupled to a control node, and a second electrode of the second reset transistor is configured to be coupled to the light-emitting element;

a gate of the data writing transistor and a gate of the compensation transistor are coupled to the gate signal terminal, a first electrode of the data writing transistor is coupled to the data signal terminal, a second electrode of the data writing transistor is coupled to an input node, a first electrode of the compensation transistor is coupled to the control node, and a second electrode of the compensation transistor is coupled to an output node;

a gate of the first light emission control transistor and a gate of the second light emission control transistor are coupled to the light emission control terminal, a first electrode of the first light emission control transistor is coupled to the driving power supply terminal, a second electrode of the first light emission control transistor is coupled to the input node, a first electrode of the second light emission control transistor is coupled to the output node, and a second electrode of the second light emission control transistor is configured to be coupled to the light-emitting element;

one terminal of the storage capacitor is coupled to the driving power supply terminal, and the other terminal of the storage capacitor is coupled to the control node; and a gate of the first drive transistor is coupled to the control node, a gate of the second drive transistor is coupled to the gate of the first drive transistor, a first electrode of the first drive transistor and a first electrode of the second drive transistor are coupled to the input node, and a second electrode of the first drive transistor and a second electrode of the second drive transistor are coupled to the output node.

In some embodiments, all the transistor in the pixel driving circuit are P-type transistors.

In another aspect, a display panel is provided. The display panel includes: a base and a plurality of pixels disposed on a side of the base; wherein each of the plurality of pixels includes a light-emitting element, and the pixel driving circuit as described in the above aspect, wherein the pixel driving circuit is coupled to the light-emitting element, and is configured to drive the light-emitting element to emit light.

In still another aspect, a method for manufacturing a display panel is provided. The method is applicable to the display panel as described in the above aspect, and the method includes:

providing a base;

forming an active layer on a side of the base, wherein the active layer includes a first active layer pattern and a second active layer pattern spaced apart from each other, wherein one of the first active layer pattern and the second active layer pattern belongs to a first drive transistor in the display panel, and the other one of the first active layer pattern and the second active layer pattern belongs to a second drive transistor in the display panel;

performing plasma treatment on a surface of the active layer away from the base;

forming a gate insulating layer on a side of the active layer away from the base, wherein the gate insulating layer covers the active layer, and a thickness of a part of the gate insulating layer covering the first active layer pattern is not equal to a thickness of a part of the gate insulating layer covering the second active layer pattern.

In some embodiments, the first active layer pattern belongs to the first drive transistor in the display panel, and the second active layer pattern belongs to the second drive transistor in the display panel; and the thickness of the part of the gate insulating layer covering the first active layer pattern is greater than a thickness of the part of the gate insulating layer covering the second active layer pattern.

In some embodiments, performing plasma treatment on the side of the active layer away from the base includes:

performing plasma treatment on a surface of the second active layer pattern away from the base;

forming the gate insulating layer on the side of the active layer away from the base includes:

forming a first gate insulating layer on a side of the first active layer pattern away from the base prior to performing plasma treatment on the surface of the second active layer pattern away from the base, wherein the first gate insulating layer covers the first active layer pattern; and forming a second gate insulating layer on the side of the second active layer pattern away from the base after performing plasma treatment on the surface of the second active layer pattern away from the base, wherein the second gate insulating layer covers the second active layer pattern and the first gate insulating layer.

In some embodiments, a thickness of a portion, overlapped with an orthographic projection of the first active layer pattern on the base, of the second gate insulating layer is equal to a thickness of a portion, overlapped with an orthographic projection of the second active layer pattern on base, of the second gate insulating layer.

In some embodiments, prior to forming the active layer on the side of the base, the method further includes:

forming a flexible material layer on the side of the base; and forming a first buffer layer on a side of the flexible material layer away from the base;

forming the active layer on the side of the base includes: forming the active layer on a side of the first buffer layer away from the base.

In some embodiments, prior to forming the active layer on the side of the first buffer layer away from the base, the method further includes:

forming a first gate layer on the side of the first buffer layer away from the base; and forming a second buffer layer on a side of the first gate layer away from the first buffer layer, wherein the second buffer layer covers the first gate layer;

forming the active layer on the side of the first buffer layer away from the base includes: forming the active layer on a side of the second buffer layer away from the base.

In some embodiments, after forming the second gate insulating layer on the side of the base, the method further includes:

forming a second gate layer on a side of the second gate insulating layer away from the base;

forming a first interlayer dielectric layer on a side of the second gate layer away from the second gate insulating layer, wherein the first interlayer dielectric layer covers the second gate layer;

forming a third gate layer on a side of the first interlayer dielectric layer away from the second gate layer;

forming a second interlayer dielectric layer on a side of the third gate layer away from the first interlayer dielectric layer, wherein the second interlayer dielectric layer covers the third gate layer;

forming a source/drain layer on a side of the second interlayer dielectric layer away from the third gate layer, wherein the source/drain layer is coupled to the active layer through a via hole penetrating through the second interlayer dielectric layer, the first interlayer dielectric layer and the gate insulating layer;

forming a planarization layer on a side of the source/drain layer away from the second interlayer dielectric layer;

forming an anode layer on a side of the planarization layer away from the source/drain layer, wherein the anode layer is coupled to the source/drain layer through a via hole penetrating through the planarization layer; and forming a pixel defining layer on a side of the anode layer away from the planarization layer, wherein the pixel defining layer covers the planarization layer and partially exposes the anode layer.

In still another aspect, a display device is provided. The display device includes: a power supply assembly, and the display panel as described in the above aspect; wherein the power supply assembly is coupled to the display panel, and is configured to supply power to the display panel.

BRIEF DESCRIPTION OF DRAWINGS

Other features, objectives and advantages of the present disclosure will become more apparent from the detailed description of the non-limiting embodiments made with reference to the following accompanying drawings.

DETAILED DESCRIPTION

Figure 1:
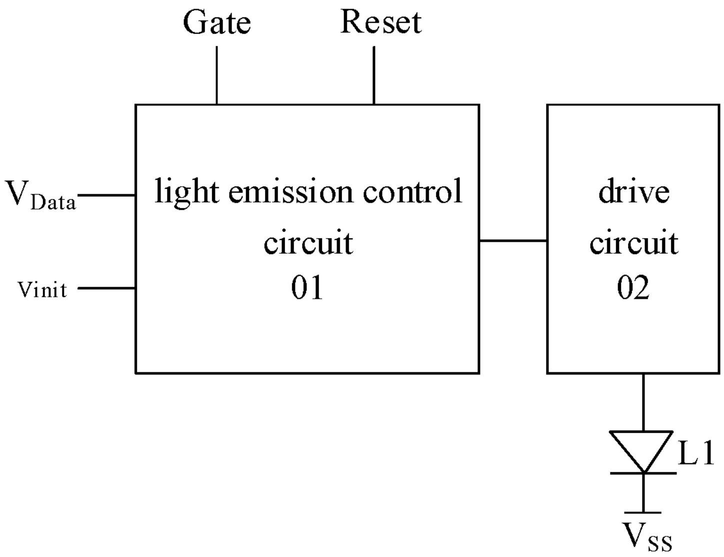
FIG. 1 is a schematic structural diagram of a pixel driving circuit according to some embodiments of the present disclosure.

The present disclosure is further described in detail below with reference to the accompanying drawings and embodiments. It is to be understood that the specific embodiments described herein are merely for explaining the relevant invention, rather than limiting the invention. In addition, it should be noted that, for ease of description, only the relevant parts of the present disclosure are shown in the accompanying drawings.

It should be noted that, in the case of no conflict, the features in the embodiments and embodiments of this application may be combined with each other. Hereinafter, the present disclosure will be described in detail with reference to the accompanying drawings and the embodiments. It should be noted that the embodiments and features in the embodiments of the present disclosure may be combined with one another on condition that they do not conflict with one another. The present disclosure is described in detail below in combination with the embodiments with reference to the accompanying drawings. The transistors used in all the embodiments of the present disclosure are thin film transistors or field-effect transistors or other devices having the same characteristics. The transistors used in the embodiments of the present disclosure are mainly switching transistors according to the functions in the circuit. Since a source and a drain of the switching transistor used here are symmetrical, the source and the drain are interchangeable. In the embodiments of the present disclosure, the source is referred to as a first electrode and the drain is referred to as a second electrode. According to the form in the drawings, an intermediate terminal of the transistor is a control electrode which may also be referred to as a gate, a signal input terminal is a source, and a signal output terminal is a drain. In addition, the switching transistors used in the embodiments of the present disclosure include any one of a P-type switching transistor and an N-type switching transistor. The P-type switching transistor is turned on when the gate is at a low level and is turned off when the gate is at a high level (that is, the P-type switching transistor is turned on when the potential of a signal received by the gate is a low potential and turned off when the potential of a signal received by the gate is a high potential, i.e., the low potential is an effective potential and the high potential is an ineffective potential), and the N-type switching transistor is turned on when the gate is at a high level and turned off when the gate is at a low level (that is, the N-type switching transistor is turned on when the potential of a signal received by the gate is a high potential and turned off when the potential of a signal received by the gate is a low potential, i.e., the high potential is an effective potential and the low potential is an ineffective potential).

In the related art, when applied as a drive transistor in an organic light-emitting diode (OLED) display panel, the oxide transistor has the problem of smaller subthreshold swing (ss). The smaller subthreshold swing makes the luminance control capability of the display panel poorer when the display panel displays low grayscale images, resulting in a poor display effect.

FIG. 1 is a schematic structural diagram of a pixel driving circuit according to some embodiments of the present disclosure. As shown in FIG. 1, the pixel driving circuit includes a light emission control circuit 01 and a drive circuit 02.

The light emission control circuit 01 is coupled to a gate signal terminal Gate, a data signal terminal $V_{Data}$, a reset signal terminal Reset, an initial power supply terminal Vinit, and a control terminal of the drive circuit 02. The light emission control circuit 01 is configured to control the potential of the control terminal of the drive circuit 02 based on a gate driving signal provided by the gate signal terminal Gate, a data signal provided by the data signal terminal $V_{Data}$, a reset signal provided by the reset signal terminal Reset. and an initial power supply signal provided by the initial power supply terminal Vinit.

An output terminal of the drive circuit 02 is configured to be coupled to a light-emitting element L1. The drive circuit 02 is configured to transmit a light emission driving signal (e.g., a driving current) to the light-emitting element L1 based on the potential of the control terminal of the drive circuit 02, to drive the light-emitting element L1 to emit light.

In some embodiments, as shown in FIG. 1, the drive circuit 02 is coupled to a first electrode of the light-emitting element L1, and a second electrode of the light-emitting element L1 is further coupled to a pull-down power supply terminal Vss. The light-emitting element L1 emits light under the action of a voltage difference between the light emission driving signal received by the first electrode and a pull-down power supply signal provided by the pull-down power supply terminal $V_{SS}$ and received by the second electrode.

In some embodiments, as shown in FIG. 1, the first electrode of the light-emitting element L1 is an anode, and the second electrode of the light-emitting element L1 is a cathode. Certainly, in some other embodiments, the first electrode of the light-emitting element L1 is a cathode, and correspondingly, the second electrode of the light-emitting element L1 is an anode.

Figure 2:
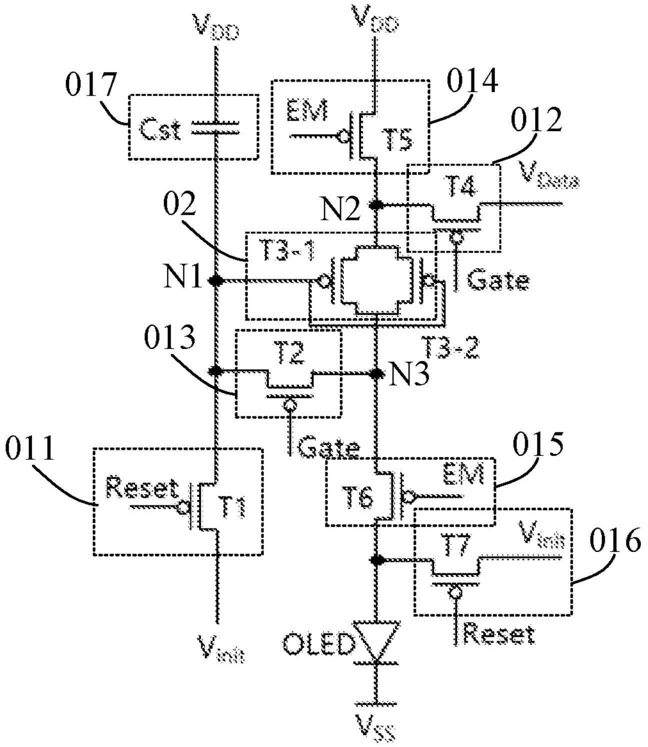
FIG. 2 is a schematic structural diagram of another pixel driving circuit according to some embodiments of the present disclosure.

In the embodiments of the present disclosure, with reference to FIG. 2 which shows another pixel driving circuit, the drive circuit 02 includes a first drive transistor T3-1 and a second drive transistor T3-2 connected in parallel. In this way, the performances of the two drive transistors can be neutralized, and by connecting the two drive transistors in parallel, the device subthreshold swing ss can be improved while the device mobility is maintained.

In addition, the subthreshold swing ss of one of the first drive transistor T3-1 and the second drive transistor T3-2 is greater than the subthreshold swing ss of the other one of the first drive transistor T3-1 and the second drive transistor T3-2. The subthreshold swing ss of the transistor is inversely proportional to the mobility, that is, the larger the subthreshold swing ss of the transistor is, the lower the mobility is; otherwise, the smaller the subthreshold swing ss of the transistor is, the higher the mobility is. Therefore, by setting the subthreshold swing ss of one drive transistor greater than the subthreshold swing ss of the other drive transistor, the mobility of one drive transistor is higher than the mobility of the other drive transistor, that is, the mobility of one drive transistor is lower, and the mobility of the other drive transistor is higher. In this way, the subthreshold swings ss of the two drive transistors can be further neutralized, thereby improving the device subthreshold swing ss while maintaining the device mobility.

In summary, the embodiments of the present disclosure provide a pixel driving circuit. In the pixel driving circuit, the drive circuit includes two drive transistors connected in parallel, and the subthreshold swing of one drive transistor is greater than the subthreshold swing of the other drive transistor. Therefore, the subthreshold swings of the two drive transistors can be neutralized, thereby improving the device subthreshold swing while maintaining the device mobility. Thus, a better display effect of the display panel is ensured.

In some embodiments, with continued reference to FIG. 2, the gate of the first drive transistor T3-1 acts as the control terminal of the drive circuit 02 and is coupled to the light emission control circuit 01, and the gate of the second drive transistor T3-2 is coupled to the gate of the first drive transistor T3-1.

The subthreshold swing ss of the first drive transistor T3-1 is greater than the subthreshold swing ss of the second drive transistor T3-2. That is, in the embodiments of the present disclosure, in the two drive transistors connected in parallel, the subthreshold swing ss of the drive transistor directly coupled to the light emission control circuit 01 is set larger, and the mobility is set lower; and the subthreshold swing ss of the other drive transistor is set smaller, and the mobility is set higher.

Figure 3:
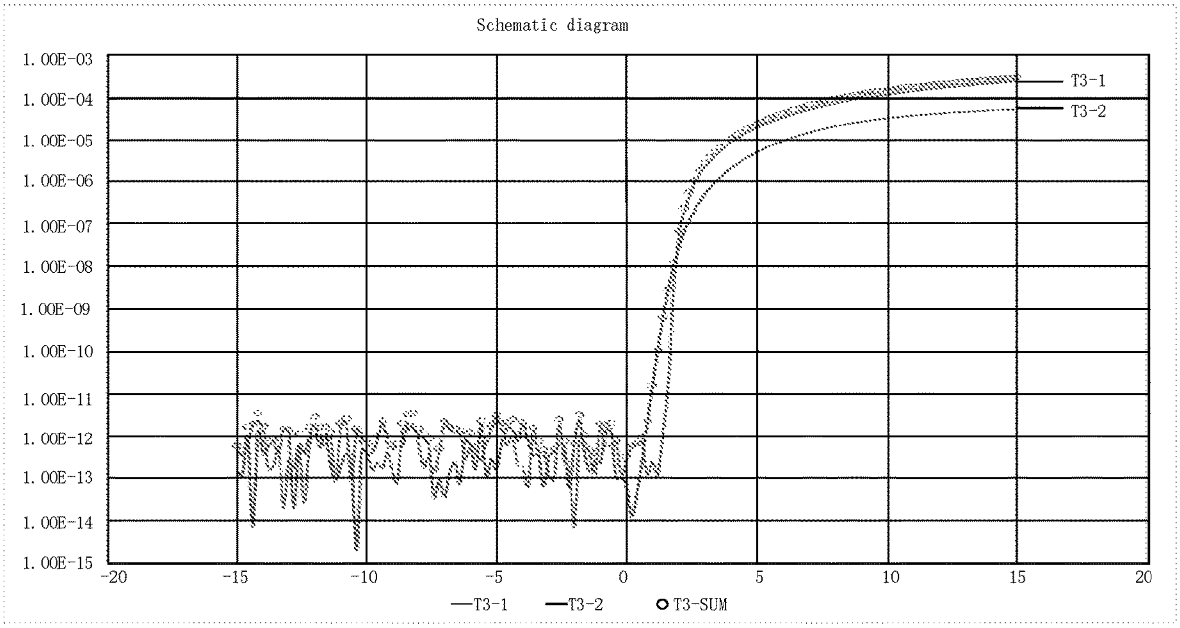
FIG. 3 is a schematic diagram showing IV characteristics of a drive circuit according to some embodiments of the present disclosure.

On the basis of FIG. 2, FIG. 3 shows a schematic diagram of an IV characteristic curve of a drive transistor. The horizontal coordinate represents voltage V, and the vertical coordinate represents current I. FIG. 3 shows the IV characteristic curve of the first drive transistor T3-1, the IV characteristic curve of the second drive transistor T3-2, and the IV characteristic curve of the first drive transistor T3-1 and the second drive transistor T3-2 connected in parallel, which is marked as T3-SUM. As can be clearly seen from FIG. 3, after the first drive transistor T3-1 and the second drive transistor T3-2 are connected in parallel, the IV characteristics can be improved, and thus the subthreshold swing ss of the first drive transistor T3-1 and the subthreshold swing ss of the second drive transistor T3-2 can be neutralized, thereby reliably improving the subthreshold swing ss of the drive circuit 02.

Figure 4:
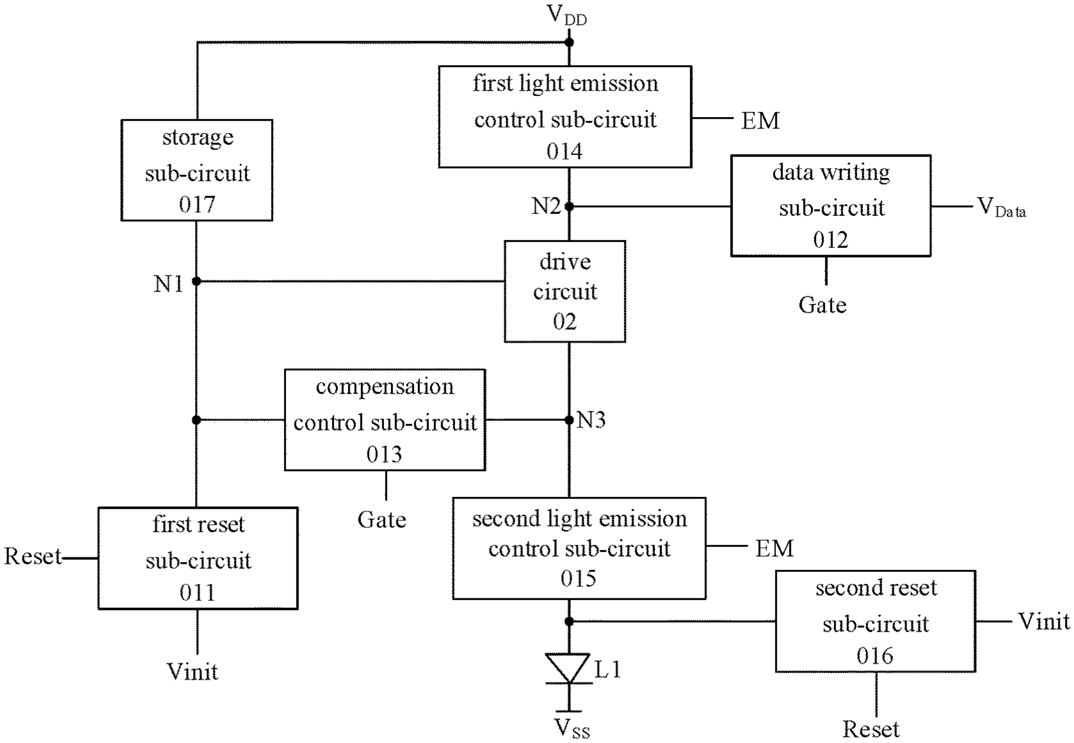
FIG. 4 is a schematic structural diagram of still another pixel driving circuit according to some embodiments of the present disclosure.

In some embodiments, with reference to FIG. 4 which shows a schematic structural diagram of another pixel driving circuit, the light emission control circuit 01 in the embodiments of the present disclosure includes a first reset sub-circuit 011, a data writing sub-circuit 012 and a compensation control sub-circuit 013.

The first reset sub-circuit 011 is coupled to the reset signal terminal Reset, the initial power supply terminal Vinit, and the control terminal of the drive circuit 02. The first reset sub-circuit 011 is configured to control the connection or disconnection between the initial power supply terminal Vinit and the control terminal of the drive circuit 02 in response to the reset signal.

For example, the first reset sub-circuit 011 controls the initial power supply terminal Vinit to be connected to the control terminal of the drive circuit 02 when the potential of the reset signal is the first potential, so that the initial power supply terminal Vinit transmits an initial power supply signal to the control terminal of the drive circuit 02. The first reset sub-circuit 011 controls the initial power supply terminal Vinit to be disconnected from the control terminal of the drive circuit 02 when the potential of the reset signal is the second potential.

In some embodiments, the first potential is an effective potential, the second potential is an ineffective potential, and the first potential is a low potential relative to the second potential. Certainly, in some other embodiments, the first potential is a high potential relative to the second potential.

The data writing sub-circuit 012 is coupled to the gate signal terminal Gate, the data signal terminal $V_{Data}$ and the input terminal of the drive circuit 02. The data writing sub-circuit 012 is configured to control the connection or disconnection between the data signal terminal $V_{Data}$ and the input terminal of the drive circuit 02 in response to the gate driving signal.

For example, the data writing sub-circuit 012 controls the data signal terminal $V_{Data}$ to be connected to the input terminal of the drive circuit 02 when the potential of the gate driving signal is the first potential, so that the data signal terminal $V_{Data}$ transmits a data signal to the input terminal of the drive circuit 02. The data writing sub-circuit 012 controls the data signal terminal $V_{Data}$ to be disconnected from the input terminal of the drive circuit 02 when the potential of the gate driving signal is the second potential.

The compensation control sub-circuit 013 is coupled to the gate signal terminal Gate, the output terminal of the drive circuit 02, and the control terminal of the drive circuit 02. The compensation control sub-circuit 013 is configured to control the connection or disconnection between the output terminal of the drive circuit 02 and the control terminal of the drive circuit 02 in response to the gate driving signal.

For example, the compensation control sub-circuit 013 controls the output terminal of the drive circuit 02 to be connected to the control terminal of the drive circuit 02 when the potential of the gate driving signal is the first potential. The compensation control sub-circuit 013 controls the output terminal of the drive circuit 02 to be disconnected from the control terminal of the drive circuit 02 when the potential of the gate driving signal is the second potential.

In some embodiments, with continued reference to FIG. 4, the light emission control circuit 01 further includes a first light emission control sub-circuit 014, a second light emission control sub-circuit 015, a second reset sub-circuit 016, and a storage sub-circuit 017.

The first light emission control sub-circuit 014 is coupled to a light emission control terminal EM, a driving power supply terminal $V_{DD}$, and the input terminal of the drive circuit 02. The first light emission control sub-circuit 014 is configured to control the connection or disconnection between the driving power supply terminal $V_{DD}$ and the input terminal of the drive circuit 02 in response to a light emission control signal provided by the light emission control terminal EM.

For example, when the potential of the light emission control signal provided by the light emission control terminal EM is the first potential, the first light emission control sub-circuit 014 controls the driving power supply terminal $V_{DD}$ to be connected to the input terminal of the drive circuit 02, so that the driving power supply terminal $V_{DD}$ transmits a driving power supply signal to the input terminal of the drive circuit 02. The first light emission control sub-circuit 014 controls the driving power supply terminal $V_{DD}$ to be disconnected from the input terminal of the drive circuit 02 when the potential of the light emission control signal provided by the light emission control terminal EM is the second potential.

The second light emission control sub-circuit 015 is coupled to the light emission control terminal EM and the output terminal of the drive circuit 02 and is configured to be coupled to the light-emitting element L1. The second light emission control sub-circuit 015 is configured to control the connection or disconnection between the output terminal of the drive circuit 02 and the light-emitting element L1 in response to the light emission control signal.

For example, the second light emission control sub-circuit 015 controls the output terminal of the drive circuit 02 to be connected to the light-emitting element L1 when the potential of the light emission control signal is the first potential, so that the signal transmitted to the output terminal of the drive circuit 02 is further transmitted to the light-emitting element L1. The second light emission control sub-circuit 015 controls the output terminal of the drive circuit 02 to be disconnected from the light-emitting element L1 when the potential of the light emission control signal is the second potential.

The second reset sub-circuit 016 is coupled to the reset signal terminal Reset and the initial power supply terminal Vinit and is configured to be coupled to the light-emitting element L1. The second reset sub-circuit 016 is configured to control the connection or disconnection between the initial power supply terminal Vinit and the light-emitting element L1 in response to the reset signal.

For example, the second reset sub-circuit 016 controls the initial power supply terminal Vinit to be connected to the light-emitting element L1 when the potential of the reset signal is the first potential, so that the initial power supply terminal Vinit transmits the initial power supply signal to the light-emitting element L1. The second reset sub-circuit 016 controls the initial power supply terminal Vinit to be disconnected from the light-emitting element L1 when the potential of the reset signal is the second potential.

The storage sub-circuit 017 is coupled to the driving power supply terminal $V_{DD}$ and the control terminal of the drive circuit 02. The storage sub-circuit 017 is configured to store the potential of the control terminal of the drive circuit 02 based on the driving power supply signal.

That is, in the embodiments of the present disclosure, the first reset sub-circuit 011 is configured to supply the initial power supply signal provided by the initial power supply terminal Vinit to the control terminal of the drive circuit 02 under the control of the reset signal terminal Reset, to reset the control terminal of the drive circuit 02; the second reset sub-circuit 016 is configured to supply the initial power supply signal provided by the initial power supply terminal Vinit to the anode of the light-emitting element L1 under the control of the reset signal terminal Reset, to reset the anode of the light-emitting element L1; the data writing sub-circuit 012 is configured to supply the data signal provided by the data signal terminal $V_{Data}$ to the input terminal of the drive circuit 02 under the control of the gate signal terminal Gate; the compensation control sub-circuit 013 is configured to adjust the potential of the control terminal of the drive circuit 02 based on the potential of the output terminal of the drive circuit 02 under the control of the gate signal terminal Gate; the first light emission control sub-circuit 014 is configured to transmit the driving power supply signal provided by the driving power supply terminal $V_{DD}$ to the drive circuit 02 under the control of the light emission control terminal EM; the second light emission control sub-circuit 015 is configured to supply the voltage of the output terminal of the drive circuit 02 to the light-emitting element L1 under the control of the light emission control terminal EM; and the drive circuit 02 is configured to drive the light-emitting element L1 to emit light under the control of the signal provided by the control terminal (for example, a signal transmitted by the first reset sub-circuit 011).

In some embodiments, with continued reference to FIG. 2, the first reset sub-circuit 011 includes a first reset transistor T1; the second reset sub-circuit 016 includes a second reset transistor T7; the data writing sub-circuit 012 includes a data writing transistor T4; the compensation control sub-circuit 013 includes a compensation transistor T2; the first light emission control sub-circuit 014 includes a first light emission control transistor T5; the second light emission control sub-circuit 015 includes a second light emission control transistor T6; and the storage sub-circuit 017 includes a storage capacitor Cst.

A gate of the first reset transistor T1 and a gate of the second reset transistor T7 are coupled to the reset signal terminal Reset, a first electrode of the first reset transistor T1 and a first electrode of the second reset transistor T7 are coupled to the initial power supply terminal Vinit, a second electrode of the first reset transistor T1 is coupled to a control node N1, and a second electrode of the second reset transistor T7 is configured to be coupled to the light-emitting element L1. Correspondingly, the initial power supply signal is transmitted to the control node N1 through the first reset transistor T1, and the initial power supply signal is transmitted to the anode of the light emitting element L1 through the second reset transistor T7.

A gate of the data writing transistor T4 and a gate of the compensation transistor T2 are coupled to the gate signal terminal Gate, a first electrode of the data writing transistor T4 is coupled to the data signal terminal $V_{Data}$ a second electrode of the data writing transistor T4 is coupled to an input node N2, a first electrode of the compensation transistor T2 is coupled to the control node N1 (i.e., a coupling node of the first reset sub-circuit 011 and the drive circuit 02), and a second electrode of the compensation transistor T2 is coupled to an output node N3. Correspondingly, the data signal is written into the input terminal of the drive circuit 02 through the data writing transistor T4, and then the data signal is written into the control terminal of the drive circuit 02 through the compensation transistor T2.

A gate of the first light emission control transistor T5 and a gate of the second light emission control transistor T6 are coupled to the light emission control terminal EM, a first electrode of the first light emission control transistor T5 is coupled to the driving power supply terminal $V_{DD}$, a second electrode of the first light emission control transistor T5 is coupled to the input node N2, a first electrode of the second light emission control transistor T6 is coupled to the output node N3, and a second electrode of the second light emission control transistor T6 is configured to be coupled to the light-emitting element L1, for example, coupled to the anode of the light-emitting element L1. Correspondingly, the driving power supply signal provided by the driving power supply terminal $V_{DD}$) is transmitted to the input terminal of the drive circuit 02 through the first light emission control transistor T5, and the signal provided by the output terminal of the drive circuit 02 is transmitted to the light-emitting element L1 through the second light emission control transistor T6.

One terminal of the storage capacitor Cst is coupled to the driving power supply terminal $V_{DD}$, and the other terminal of the storage capacitor Cst is coupled to the control node N1 (i.e., the coupling node of the first reset sub-circuit 011 and the drive circuit 02).

The gate of the first drive transistor T3-1 is coupled to the control node N1, the gate of the second drive transistor T3-2 is coupled to the gate of the first drive transistor T3-1, the first electrode of the first drive transistor T3-1 and the first electrode of the second drive transistor T3-2 are coupled to the input node N2, and the second electrode of the first drive transistor T3-1 and the second electrode of the second drive transistor T3-2 are coupled to the output node N3. It can be seen that the control terminal of the drive circuit 02 is the control node N1, the input terminal of the drive circuit 02 is the input node N2, and the output terminal of the drive circuit 02 is the output node N3.

Optionally, as can be seen from FIG. 3, all the transistors included in the pixel driving circuit in the embodiments of the present disclosure are P-type transistors. Correspondingly, the first potential (i.e., the effective potential) in the foregoing embodiments is a low potential, and the second potential (i.e., the ineffective potential) is a high potential. The light-emitting element L1 shown in FIG. 3 is an OLED.

That is, in the embodiments of the present disclosure, in the light emission control circuit 01, the first reset sub-circuit 011 is implemented by the first reset transistor T1; the second reset sub-circuit 016 is implemented by the second reset transistor T7; the data writing sub-circuit 012 is implemented by the data writing transistor T4; the compensation control sub-circuit 013 is implemented by the compensation transistor T2; the first light emission control sub-circuit 014 is implemented by the first light emission control transistor T5; the second light emission control sub-circuit 015 is implemented by the second light emission control transistor T6; and the storage sub-circuit 017 is implemented by the storage capacitor Cst. The drive circuit 02 is implemented by the first drive transistor T3-1 and the second drive transistor T3-2 connected in parallel. The gate of the first drive transistor T3-1 and the gate of the second drive transistor T3-2 are both coupled to the first reset sub-circuit 011, and the first electrode of the first drive transistor T3-1 and the first electrode of the second drive transistor T3-2 are both coupled to the first light emission control sub-circuit 014.

It should be noted that the pixel driving circuit shown in FIG. 3 is considered to have an 8T1C (i.e., including 8 transistors and 1 capacitor). In some other embodiments, the pixel driving circuit may also have other structures, such as a 6T2C structure, provided that the drive circuit 02 includes two drive transistors connected in parallel as shown in FIG. 3.

In summary, the embodiments of the present disclosure provide a pixel driving circuit. In the pixel driving circuit, the drive circuit includes two drive transistors connected in parallel, and the subthreshold swing of one drive transistor is greater than the subthreshold swing of the other drive transistor. Therefore, the subthreshold swings of the two drive transistors can be neutralized, thereby improving the device subthreshold swing while maintaining the device mobility. Thus, a better display effect of the display panel is ensured.

Figure 5:
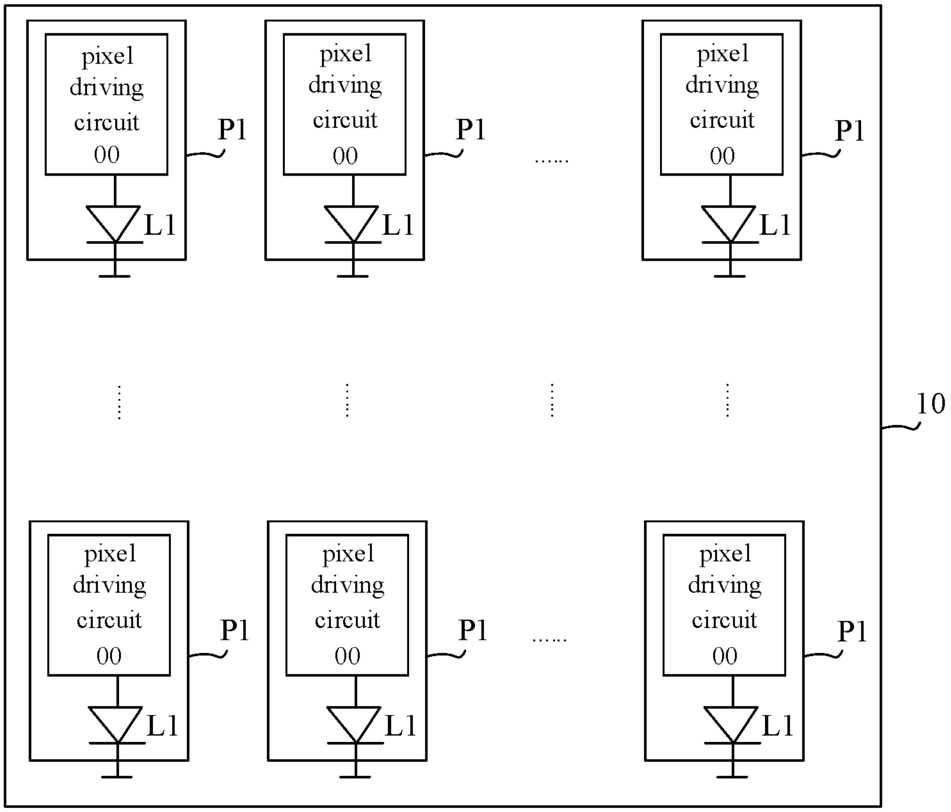
FIG. 5 is a schematic structural diagram of a display panel according to some embodiments of the present disclosure.

Based on the same inventive concept, the embodiments of the present disclosure further provide a display panel. As shown in FIG. 5, the display panel includes a base 10 and a plurality of pixels PI disposed on a side of the base 10. Each of the plurality of pixels PI includes a light-emitting element L1, and the pixel driving circuit 00 described in the foregoing embodiments. The pixel driving circuit 00 is coupled to the light-emitting element L1, and is configured to drive the light-emitting element L1 to emit light.

It should be noted that the display panel in the embodiments of the present disclosure adopts the above pixel driving circuit. The principle of solving problems by the display panel is similar to that of the pixel driving circuit described above, and reference may be made to the foregoing embodiments of the pixel driving circuit, and details are not repeated herein.

Figure 6:
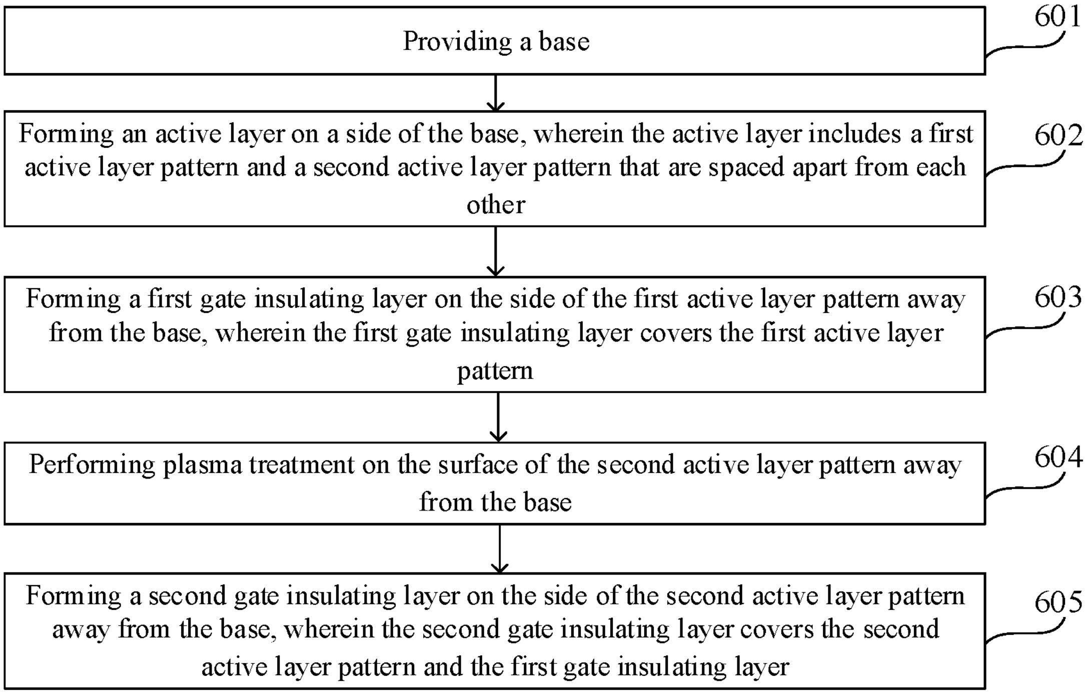
FIG. 6 is a flowchart of a method for manufacturing a display panel according to some embodiments of the present disclosure.

Based on the same inventive concept, the embodiments of the present disclosure further provide a method for manufacturing a display panel, applicable to the display panel as described in the foregoing embodiments. As shown in FIG. 6, the method includes the following steps.

In step 601, a base is provided.

In the process of manufacturing the display panel, a base is first provided. The base is also referred to as a substrate. For example, FIG. 7 and FIG. 8 respectively show the sectional views of two display panels at the drive circuit 02, and both show the base 10.

In some embodiments, the base 10 herein is a glass substrate. Certainly, in some other embodiments, the base 10 may also be a flexible base.

In step 602, an active layer is formed on a side of the base. The active layer includes a first active layer pattern and a second active layer pattern that are spaced apart from each other.

Figure 7:
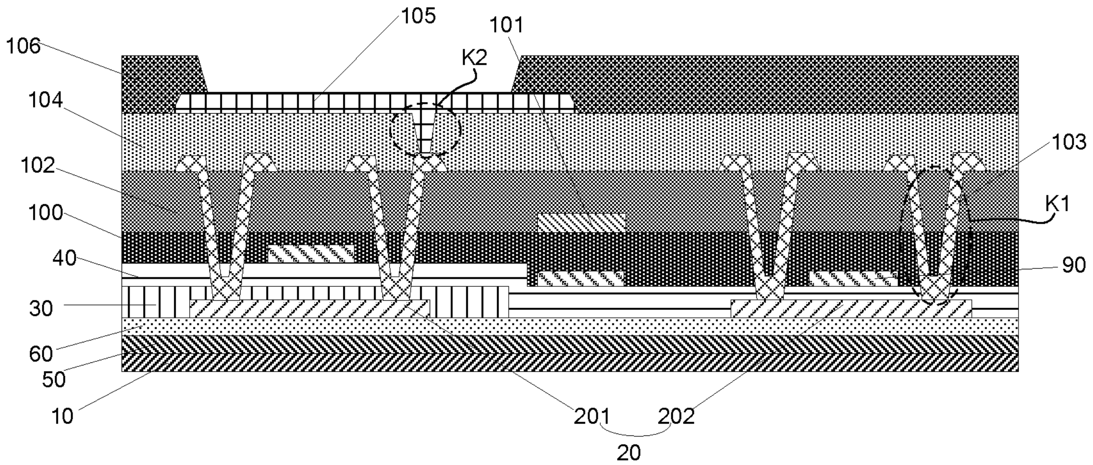
FIG. 7 is a sectional view of a display panel according to some embodiments of the present disclosure.
Figure 8:
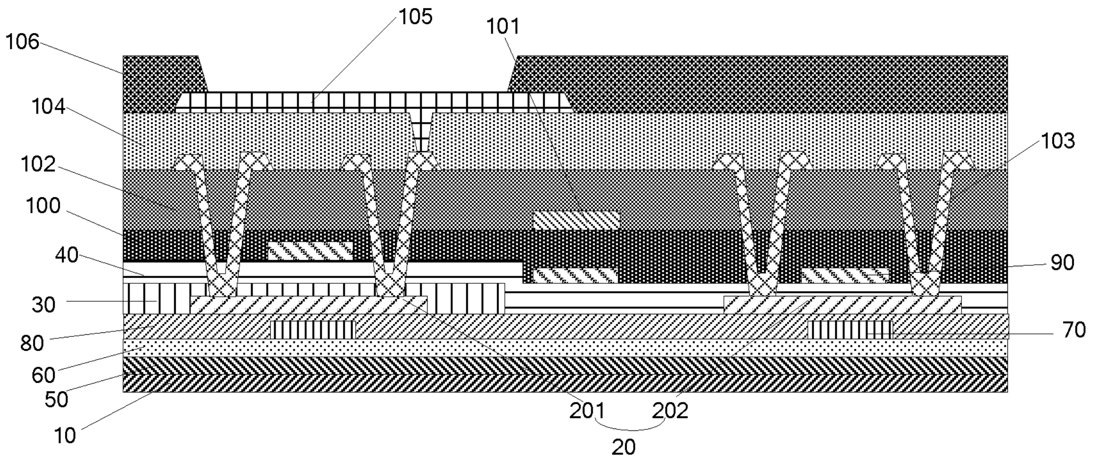
FIG. 8 is a sectional view of another display panel according to some embodiments of the present disclosure.
Figure 9:
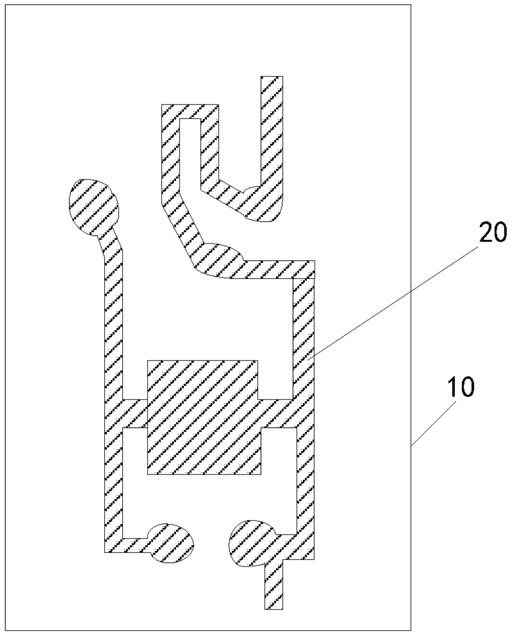
FIG. 9 is a top view of a display panel according to some embodiments of the present disclosure.

Optionally, with reference to FIG. 7 and FIG. 8, in the embodiments of the present disclosure, the active layer 20 is formed on a side of the base 10 by a sputtering process. FIG. 9 shows a top view of a display panel, in which an active layer 20 is formed on a side of the base 10.

In some embodiments, the material of the active layer 20 includes metal oxides such as indium gallium zinc oxide (IGZO), indium zinc oxide (IZO), indium gallium oxide (IGO), indium tin zinc oxide (ITZO), and gallium tin oxide (ZTO).

In the embodiments of the present disclosure, one of the first active layer pattern 201 and the second active layer pattern 202 belongs to the first drive transistor (i.e., T3-1 shown in FIG. 3) in the display panel, and the other one of the first active layer pattern 201 and the second active layer pattern 202 belongs to the second drive transistor (i.e., T3-2 shown in FIG. 3) in the display panel. That is, the active layer 20 includes the active layer pattern of the first drive transistor T3-1 and the active layer pattern of the second drive transistor T3-2.

In step 603, a first gate insulating layer is formed on the side of the first active layer pattern away from the base. The first gate insulating layer covers the first active layer pattern.

Figure 10:
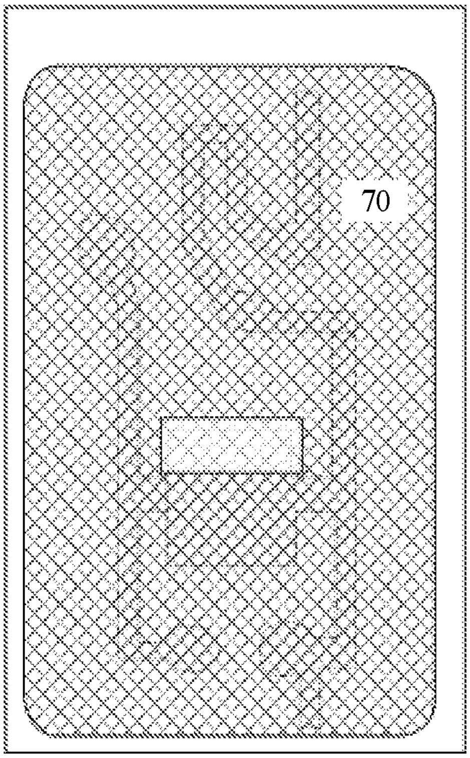
FIG. 10 is a sectional view of still another display panel according to some embodiments of the present disclosure.

In some embodiments, with continued reference to FIG. 7 and FIG. 8, after the active layer 20 is formed, the first gate insulating layer 30 is formed by chemical vapor deposition. Further, the first gate insulating layer 30 is patterned by photoetching (which is also referred to as a patterning process) to form the pattern in the top view shown in FIG. 10. The patterning process includes: exposure, development, etching, and the like. The first gate insulating layer 30 is disposed to cover the first active layer pattern 201, and the gate insulating layer at the first active layer pattern 20 is thickened, thereby forming the first drive transistor T3-1 with a larger subthreshold swing ss.

In some embodiments, the material of the first gate insulating layer 30 includes silicon dioxide $SiO_2$, aluminum oxide $Al_2O_3$, hafnium dioxide $HfO_2$, zirconium dioxide $ZrO_2$, titanium oxide TiOx or silicon nitride SiNx.

In step 604, plasma treatment is performed on the surface of the second active layer pattern away from the base.

In some embodiments, with reference to FIG. 7 to FIG. 9, nitrogen dioxide $N_2O$ or oxygen $O_2$ plasma treatment is performed on the surface of the second active layer pattern 202 away from the base 10, to enable the threshold voltage Vth of the transistor in the region to be positively biased.

In step 605, a second gate insulating layer is formed on the side of the second active layer pattern away from the base. The second gate insulating layer covers the second active layer pattern and the first gate insulating layer.

In some embodiments, with continued reference to FIG. 7 and FIG. 8, after the plasma treatment is performed on the surface of the second active layer pattern 202 away from the base 10, the second gate insulating layer 40 is deposited by chemical vapor deposition. The material of the second gate insulating layer 40 also includes: silicon dioxide $SiO_2$, aluminum oxide $Al_2O_3$, hafnium dioxide $HfO_2$, zirconium dioxide $ZrO_2$, titanium oxide TiOx or silicon nitride SiNx as described in the foregoing embodiments. The second gate insulating layer 40 is disposed to cover the first gate insulating layer 30 and the second active layer pattern 202. In this way, the thickness of a part of the gate insulating layer (including the first gate insulating layer 30 and the second gate insulating layer 40) covering the first active layer pattern 201 is greater than the thickness of a part of the gate insulating layer covering the second active layer pattern 202. That is, the thickness of the gate insulating layer covering the first active layer pattern 201 is different from the thickness of the gate insulating layer covering the second active layer pattern 202, and the gate insulating layer has different thicknesses on the two active layer patterns.

The thicker the gate insulating layer is, the smaller the capacitance of the formed transistor is, and the weaker the gate electric field is; otherwise, the thinner the gate insulating layer is, the larger the capacitance of the formed transistor is, and the stronger the gate electric field is. Therefore, two drive transistors with a larger subthreshold swing ss and a smaller subthreshold swing ss can be formed. That is, the subthreshold swings ss of the first drive transistor T3-1 and the second drive transistor T3-2 shown in FIG. 2 are different. That is, as described in the foregoing embodiments, in the first drive transistor T3-1 and the second drive transistor T3-2, the subthreshold swing ss of one drive transistor is greater than the subthreshold swing ss of the other drive transistor. Furthermore, by forming the first gate insulating layer 30 first and then forming the second gate insulating layer 40, two drive transistors connected in parallel are manufactured.

In other words, in the embodiments of the present disclosure, after the corresponding active layer 20 is provided, a gate insulating layer needs to be provided to cover the active layer 20. In this way, the two drive transistors manufactured not only are connected in parallel, but also have different subthreshold swings ss. Connecting the two drive transistors in parallel can neutralize the performances of the two drive transistors, thereby improving the subthreshold swings ss of the drive transistors of the drive circuit, and improving the luminance control capability of the display panel when the display panel displays low grayscale images, without reducing the mobility. It can be known from the foregoing embodiments that different subthreshold swings ss of the drive transistors are achieved by providing the gate insulating layer with different thicknesses.

Optionally, in the embodiments of the present disclosure, the first active layer pattern 201 belongs to the first drive transistor T3-1 in the display panel, and the second active layer pattern 202 belongs to the second drive transistor T3-2 in the display panel. The subthreshold swing ss of the first drive transistor T3-1 is greater than the subthreshold swing ss of the second drive transistor T3-2. That is, in the two drive transistors connected in parallel, the subthreshold swing ss of the drive transistor directly coupled to the light emission control circuit is larger, and the mobility thereof is lower; and the subthreshold swing ss of the other drive transistor is smaller, and the mobility is higher, thereby better improving the subthreshold swing.

In some embodiments, on the basis of the foregoing embodiments, with continued reference to FIG. 7 and FIG. 8, the thickness of the portion, overlapped with the orthographic projection of the first active layer pattern 201 on the base 10, of the second gate insulating layer 40 is equal to the thickness of the portion, overlapped with the orthographic projection of the second active layer pattern 202 on the base 10, of the second gate insulating layer 40.

Further, the second gate insulating layer 40 has the same thickness at the first active layer pattern 201 and the second active layer pattern 202, which ensures that the structures of two drive transistors connected in parallel can be formed reliably.

In some embodiments, with continued reference to the sectional views shown in FIG. 7 and FIG. 8, before the active layer 20 is formed on the side of the base 10 (i.e., the above step 602), the manufacturing method further includes: forming a flexible material layer 50 on the side of the base 10.

In some embodiments, the flexible material includes polyimide (PI), and on this basis, the flexible material layer 50 is also referred to as a PI layer.

Next, a first buffer layer 60 is formed on the side of the flexible material layer 50 away from the base 10.

In some embodiments, the material of the first buffer layer 60 includes silicon dioxide $SiO_2$, silicon nitride SiNx or silicon oxynitride SiON.

Correspondingly, forming the active layer 20 on the side of the base 10 includes: forming the active layer 20 on the side of the first buffer layer 60 away from the base 10.

In some embodiments, with continued reference to FIG. 8, before the active layer 20 is formed on the side of the first buffer layer 60 away from the base 10 (i.e., the above step 602), the manufacturing method further includes: forming a first gate layer 70 on the side of the first buffer layer 60 away from the base 10; and forming a second buffer layer 80 on the side of the first gate layer 70 away from the first buffer layer 60. The second buffer layer 80 covers the first gate layer 70. That is, the second buffer layer 80 is disposed to cover the first gate layer 70.

In some embodiments, the first gate layer 70 and the second buffer layer 80 are sequentially deposited on the side of the first buffer layer 60 away from the base 10.

In some embodiments, the material of the first gate layer 70 includes metals such as molybdenum (Mo), titanium (Ti), aluminum (Al), copper (Cu), indium tin oxide (ITO), and argentum (Ag), and alloys thereof, and the first gate layer 70 is patterned by photoetching. The material of the second buffer layer 80 includes silicon dioxide $SiO_2$, aluminum oxide $Al_2O_3$, hafnium dioxide $HfO_2$, zirconium dioxide $ZrO_2$, titanium oxide TiOx or silicon nitride SiNx.

That is, two implementations shown in FIG. 7 and FIG. 8 are provided for the display panel in the embodiments of the present disclosure. The structure shown in FIG. 8 is a dual-gate transistor structure. When the dual-gate structure shown in FIG. 8 is manufactured, the first buffer layer 60 as described in the foregoing embodiments needs to be formed first, next, the first gate layer 70 is formed on the first buffer layer 60, and then the second buffer layer 80 is deposited on the first gate layer 70 by chemical vapor deposition. The second buffer layer 80 is disposed to cover the first gate layer 70 and the exposed first buffer layer 60. The first gate layer 70 is formed before the active layer 20 is formed, which provides a condition for forming the transistor having the dual-gate structure later.

Correspondingly, forming the active layer 20 on the side of the first buffer layer 60 away from the base 10 includes: forming the active layer 20 on the side of the second buffer layer 80 away from the base 10.

In some embodiments, with continued reference to FIG. 7 and FIG. 8, after the second gate insulating layer is formed on the side of the base 10 (i.e., the above step 605), the manufacturing method further includes the followings.

A second gate layer 90 is formed on the side of the second gate insulating layer 40 away from the base 10. That is, the second gate layer 90 is disposed on the second gate insulating layer 40.

A first interlayer dielectric layer 100 is formed on the side of the second gate layer 90 away from the second gate insulating layer 40, and the first interlayer dielectric layer 100 covers the second gate layer 90. That is, the first interlayer dielectric layer 100 is disposed on the second gate layer 90, and the first interlayer dielectric layer 100 is disposed to cover the second gate layer 90.

A third gate layer 101 is formed on the side of the first interlayer dielectric layer 100 away from the second gate layer 90. That is, the third gate layer 101 is disposed on the first interlayer dielectric layer 100.

A second interlayer dielectric layer 102 is formed on the side of the third gate layer 101 away from the first interlayer dielectric layer 100, and the second interlayer dielectric layer 102 covers the third gate layer 101. That is, the second interlayer dielectric layer 102 is disposed on the third gate layer 101, and the second interlayer dielectric layer 102 is disposed to cover the third gate layer 101.

A source/drain layer 103 is formed on the side of the second interlayer dielectric layer 102 away from the third gate layer 101. The source/drain layer 103 is coupled to the active layer 20 through a via hole K1 penetrating through the second interlayer dielectric layer 102, the first interlayer dielectric layer 100, the second gate insulating layer 40 and the first gate insulating layer 30. That is, the source/drain layer 103 is formed on the second interlayer dielectric layer 102, and the source/drain layer 103 is coupled to the active layer 20 through the via hole K1.

A planarization layer 104 is formed on the side of the source/drain layer 103 away from the second interlayer dielectric layer 102. That is, the planarization layer 104 covers the source/drain layer 103.

An anode layer 105 is formed on the side of the planarization layer 104 away from the source/drain layer 103. The anode layer 105 is coupled to the source/drain layer 103 through a via hole K2 penetrating through the planarization layer 104. That is, the anode layer 105 is deposited on the planarization layer 104, and the anode layer 105 is coupled to the source/drain layer 103 through the via hole K2.

A pixel defining layer 106 is formed on a side of the planarization layer 104. The pixel defining layer 106 covers the planarization layer 104 and partially exposes the anode layer 105. In some embodiments, the pixel defining layer 106 is an organic film layer, and correspondingly, an organic film layer is formed. The organic film layer is disposed to cover the planarization layer 104 and partially expose the anode layer 105.

Figure 11:
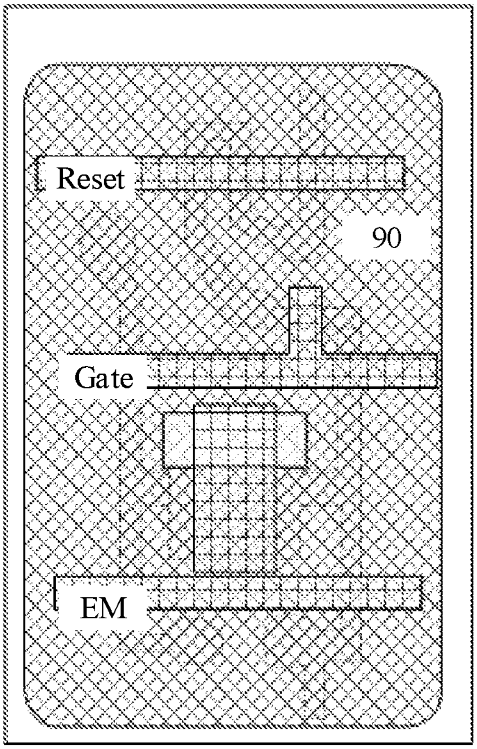
FIG. 11 is a sectional view of still another display panel according to some embodiments of the present disclosure.

For the structures shown in FIG. 7 and FIG. 8, after the second gate insulating layer 40 and the two drive transistors are formed, the second gate layer 90 is disposed on the second gate insulating layer 40. For the structure shown in FIG. 7, the second gate layer 90 is the first gate layer, and the material of the second gate layer 90 also includes metals such as molybdenum (Mo), titanium (Ti), aluminum (Al), copper (Cu), indium tin oxide (ITO), and argentum (Ag), and alloys thereof, and the second gate layer 90 is patterned by photoetching to form the structure shown in FIG. 11.

Next, the first interlayer dielectric layer 100 is deposited by chemical vapor deposition. The first interlayer dielectric layer 100 covers the second gate layer 90, and the material of the first interlayer dielectric layer 100 includes silicon dioxide $SiO_2$, aluminum oxide $Al_2O_3$, hafnium dioxide $HfO_2$, zirconium dioxide $ZrO_2$, titanium oxide TiOx or silicon nitride SiNx.

Figure 12:
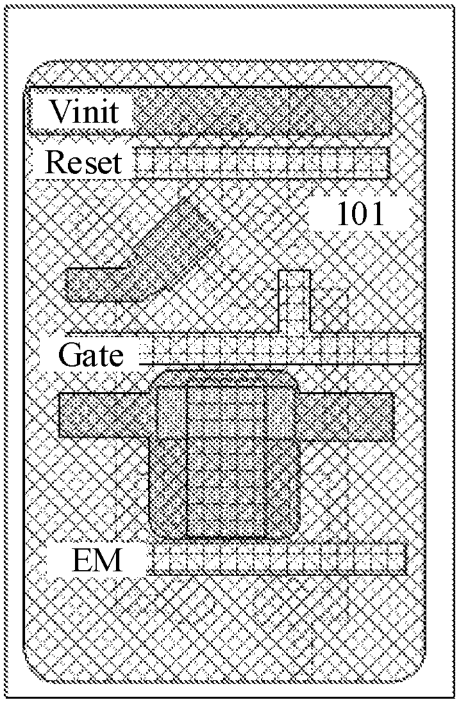
FIG. 12 is a sectional view of still another display panel according to some embodiments of the present disclosure.

Next, the third gate layer 101 is formed on the first interlayer dielectric layer 100. The material of the third gate layer 101 also includes metals such as molybdenum (Mo), titanium (M), aluminum (Al), copper (Cu), indium tin oxide (ITO), and argentum (Ag), and alloys thereof, and the third gate layer 101 is patterned by photoetching to form the structure shown in FIG. 12.

Figure 13:
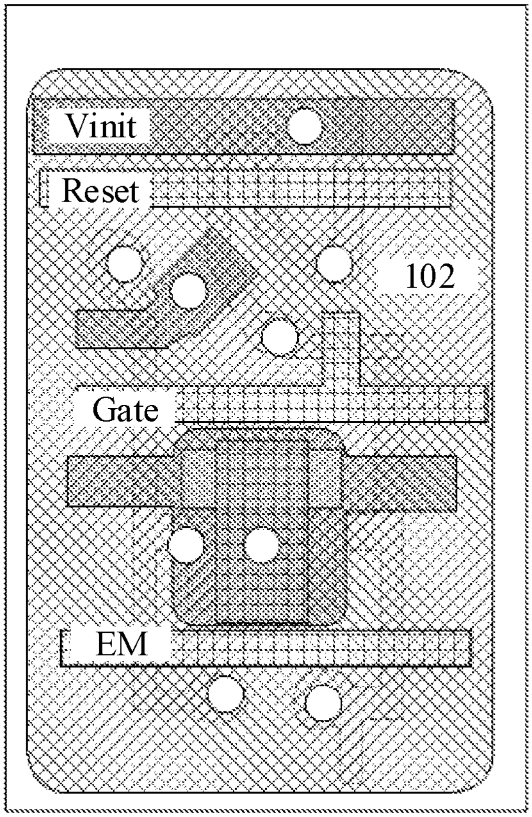
FIG. 13 is a sectional view of still another display panel according to some embodiments of the present disclosure.

Next, the second interlayer dielectric layer 102 is deposited by chemical vapor deposition. The material of the second interlayer dielectric layer 102 also includes silicon dioxide $SiO_2$, aluminum oxide $Al_2O_3$, hafnium dioxide $HfO_2$, zirconium dioxide $ZrO_2$, titanium oxide TiOx or silicon nitride SiNx. The first interlayer dielectric layer 100, the second interlayer dielectric layer 102, the first gate insulating layer 30, and the second gate insulating layer 40 are all provided with a via hole, and the corresponding active layer pattern is exposed from the via hole to form the structure shown in FIG. 13.

Figure 14:
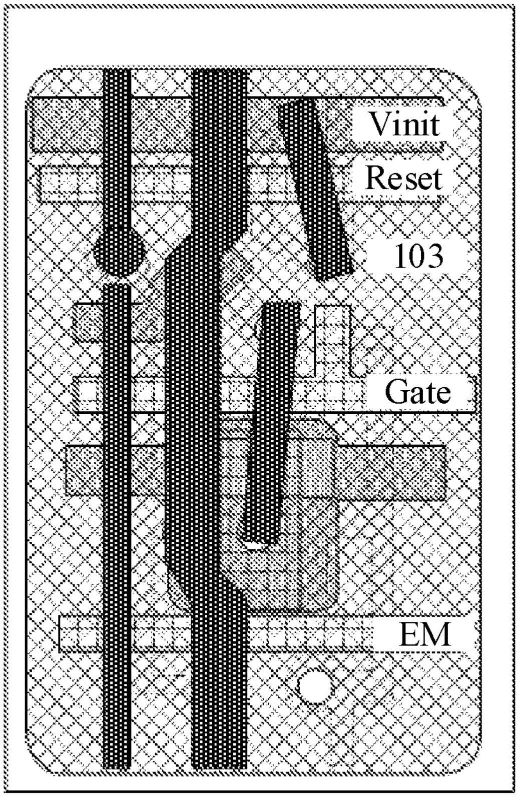
FIG. 14 is a sectional view of still another display panel according to some embodiments of the present disclosure.

Next, the source/drain layer 103 is deposited on the second interlayer dielectric layer 102 by sputtering. The material of the source/drain layer 103 also includes metals such as molybdenum (Mo), titanium (T), aluminum (Al), copper (Cu), indium tin oxide (ITO), and argentum (Ag), and alloys thereof. The source/drain layer 103 is patterned by photoetching, and the source/drain layer 103 is further coupled to the corresponding active layer 20 through the via hole described above to form the structure shown in FIG. 14.

Next, the planarization layer 104 is manufactured, and is patterned by photoetching.

Next, the anode layer 105 is deposited on the planarization layer 104 by sputtering. The material of the anode layer 105 also include metals such as molybdenum (Mo), titanium (M), aluminum (Al), copper (Cu), indium tin oxide (ITO), and argentum (Ag), and alloys thereof. The anode layer 105 is patterned by photoetching, and the anode layer 105 is coupled to the source/drain layer 103 through the via hole formed in the planarization layer 104.

Finally, the organic film layer (i.e., the pixel defining layer 106) is manufactured, and is patterned by photoetching. The organic film layer partially exposes the anode layer.

The above steps are the same as the steps in the methods for manufacturing the structures shown in FIG. 7 and FIG. 8.

The display panel manufactured according to the above steps has two drive transistors connected in parallel. The subthreshold swing ss of one drive transistor is larger, the subthreshold swing ss of the other drive transistor is smaller, and the subthreshold swings ss can be neutralized by connecting the two structures in parallel. Furthermore, the gate insulating layers having different thicknesses are manufactured separately in the above steps. After the first gate insulating layer is manufactured, a part of the active layer is processed when plasma treatment is performed on the surface of the first gate insulating layer.

In summary, the embodiments of the present disclosure provide a method for manufacturing a display panel. In the display panel manufactured according to this method, the thickness of the gate insulating layer on a side of the active layer pattern of the first drive transistor is different from the thickness of the gate insulating layer on a side of the active layer pattern of the second drive transistor. Therefore, the subthreshold swing of one drive transistor is greater than the subthreshold swing of the other drive transistor, and the subthreshold swings of the two drive transistors can be neutralized, which can improve the device subthreshold swing while maintaining the device mobility. Thus, a better display effect of the display panel is ensured.

Figure 15:
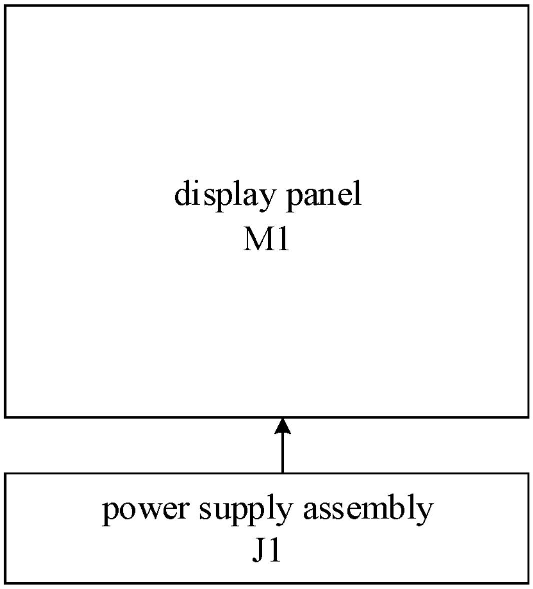
FIG. 15 is a schematic structural diagram of a display device according to some embodiments of the present disclosure.

Based on the same inventive concept, the embodiments of the present disclosure further provide a display device. As shown in FIG. 15, the display device includes a power supply assembly J1, and the display panel M1 as shown in FIG. 5. The power supply assembly J1 is coupled to the display panel M1, and is configured to supply power to the display panel M1.

In some embodiments, the display device provided in the embodiments of the present disclosure includes a display, a mobile phone, a television, a notebook computer and/or a navigator, etc., and other essential components of the display device are understood to be included by those of ordinary skill in the art, and details are not described herein again.

It should be understood that the orientations or positional relationships indicated by terms "center," "longitudinal," "transverse," "on," "under," "front," "back," "left," "right," "vertical," "horizontal," "top," "bottom," "inner," "outer" and the like are shown based on the drawings, and are merely for ease of description of the embodiments and simplified description of the present disclosure, but not intended to indicate or imply that the device or element must be oriented specifically, be constructed and operated in a specific orientation. Therefore, the orientations or positional relationships cannot be construed as limiting the embodiments of the present disclosure. The orientation words "inner and outer" refer to the inner and outer relative to the contour of the component itself. Furthermore, the terms "first" and "second" are for descriptive purposes only and shall not be construed as indicating or implying relative importance or implicitly indicating the amount of the indicated technical features. Thus, the features defined by "first" or "second" may explicitly or implicitly include one or more of the features.

For ease of description, spatial relative terms such as "on," "over," "on the surface of . . . ," "above," and the like herein are used to describe the spatial positional relationship between one device or feature and other devices or features as shown in the figures. It should be understood that the spatial relative terms are intended to encompass different orientations in use or operation in addition to the orientation of the device described in the figures. For example, if a device in the figures is turned upside down, the device described as being "over" or "on" other devices or structures will be positioned "below" or "under" the other devices or structures. Thus, the exemplary term "over" may include both orientations of "over" and "below". The device may also be rotated 90 degrees or in other orientations in other different ways, and the spatial relative description shall be explained correspondingly.

The descriptions above are merely some embodiments of the present disclosure and are to describe the technical principles used in the embodiments. It should be understood by those skilled in the art that the invention scope of the present disclosure is not limited to the technical solutions of the specific combinations of the above technical features, and shall also encompass other technical solutions of any combinations of the above technical features or their equivalents without departing from the inventive concept, for example, the technical solutions formed by exchanging the above features with technical features with similar functions disclosed (not limited) in the present disclosure.

What is claimed is:

1. A pixel driving circuit, comprising: a light emission control circuit and a drive circuit; wherein the light emission control circuit is coupled to a gate signal terminal, a data signal terminal, a reset signal terminal, an initial power supply terminal, and a control terminal of the drive circuit, and the light emission control circuit is configured to control a potential of the control terminal of the drive circuit based on a gate driving signal provided by the gate signal terminal, a data signal provided by the data signal terminal, a reset signal provided by the reset signal terminal, and an initial power supply signal provided by the initial power supply terminal; and an output terminal of the drive circuit is configured to be coupled to a light-emitting element, and the drive circuit is configured to transmit a light emission driving signal to the light-emitting element based on the potential of the control terminal of the drive circuit, to drive the light-emitting element to emit light;

wherein the drive circuit comprises a first drive transistor and a second drive transistor connected in parallel; and a subthreshold swing of one of the first drive transistor and the second drive transistor is greater than a subthreshold swing of the other one of first drive transistor and the second drive transistor.

2. The pixel driving circuit according to claim 1, wherein a gate of the first drive transistor acts as the control terminal of the drive circuit and is coupled to the light emission control circuit, and a gate of the second drive transistor is coupled to the gate of the first drive transistor; and the subthreshold swing of the first drive transistor is greater than the subthreshold swing of the second drive transistor.

3. The pixel driving circuit according to claim 1, wherein the light emission control circuit comprises: a first reset sub-circuit, a data writing sub-circuit and a compensation control sub-circuit; wherein the first reset sub-circuit is coupled to the reset signal terminal, the initial power supply terminal, and the control terminal of the drive circuit, and the first reset sub-circuit is configured to control connection or disconnection between the initial power supply terminal and the control terminal of the drive circuit in response to the reset signal;

the data writing sub-circuit is coupled to the gate signal terminal, the data signal terminal, and an input terminal of the drive circuit, and the data writing sub-circuit is configured to control connection or disconnection between the data signal terminal and the input terminal of the drive circuit in response to the gate driving signal; and the compensation control sub-circuit is coupled to the gate signal terminal, the output terminal of the drive circuit, and the control terminal of the drive circuit, and the compensation control sub-circuit is configured to control connection or disconnection between the output terminal of the drive circuit and the control terminal of the drive circuit in response to the gate driving signal.

4. The pixel driving circuit according to claim 3, wherein the light emission control circuit further comprises: a first light emission control sub-circuit, a second light emission control sub-circuit, a second reset sub-circuit and a storage sub-circuit; wherein the first light emission control sub-circuit is coupled to a light emission control terminal, a driving power supply terminal, and the input terminal of the drive circuit, and the first light emission control sub-circuit is configured to control connection or disconnection between the driving power supply terminal and the input terminal of the drive circuit in response to a light emission control signal provided by the light emission control terminal;

the second light emission control sub-circuit is coupled to the light emission control terminal and the output terminal of the drive circuit and is configured to be coupled to the light-emitting element, and the second light emission control sub-circuit is configured to control connection or disconnection between the output terminal of the drive circuit and the light-emitting element in response to the light emission control signal;

the second reset sub-circuit is coupled to the reset signal terminal and the initial power supply terminal and is configured to be coupled to the light-emitting element, and the second reset sub-circuit is configured to control connection or disconnection between the initial power supply terminal and the light-emitting element in response to the reset signal; and the storage sub-circuit is coupled to the driving power supply terminal and the control terminal of the drive circuit, and the storage sub-circuit is configured to store the potential of the control terminal of the drive circuit based on the driving power supply signal.

5. The pixel driving circuit according to claim 4, wherein the first reset sub-circuit comprises: a first reset transistor; the second reset sub-circuit comprises: a second reset transistor; the data writing sub-circuit comprises: a data writing transistor; the compensation control sub-circuit comprises: a compensation transistor; the first light emission control sub-circuit comprises: a first light emission control transistor; the second light emission control sub-circuit comprises: a second light emission control transistor; and the storage sub-circuit comprises: a storage capacitor; wherein a gate of the first reset transistor and a gate of the second reset transistor are coupled to the reset signal terminal, a first electrode of the first reset transistor and a first electrode of the second reset transistor are coupled to the initial power supply terminal, a second electrode of the first reset transistor is coupled to a control node, and a second electrode of the second reset transistor is configured to be coupled to the light-emitting element;

a gate of the data writing transistor and a gate of the compensation transistor are coupled to the gate signal terminal, a first electrode of the data writing transistor is coupled to the data signal terminal, a second electrode of the data writing transistor is coupled to an input node, a first electrode of the compensation transistor is coupled to the control node, and a second electrode of the compensation transistor is coupled to an output node;

a gate of the first light emission control transistor and a gate of the second light emission control transistor are coupled to the light emission control terminal, a first electrode of the first light emission control transistor is coupled to the driving power supply terminal, a second electrode of the first light emission control transistor is coupled to the input node, a first electrode of the second light emission control transistor is coupled to the output node, and a second electrode of the second light emission control transistor is configured to be coupled to the light-emitting element;

one terminal of the storage capacitor is coupled to the driving power supply terminal, and the other terminal of the storage capacitor is coupled to the control node; and a gate of the first drive transistor is coupled to the control node, a gate of the second drive transistor is coupled to the gate of the first drive transistor, a first electrode of the first drive transistor and a first electrode of the second drive transistor are coupled to the input node, and a second electrode of the first drive transistor and a second electrode of the second drive transistor are coupled to the output node.

6. The pixel driving circuit according to claim 5, wherein all the transistor in the pixel driving circuit are P-type transistors.

7. A display panel, comprising: a base and a plurality of pixels disposed on a side of the base; wherein each of the plurality of pixels comprises a light-emitting element, and a pixel driving circuit, wherein the pixel driving circuit is coupled to the light-emitting element, and is configured to drive the light-emitting element to emit light, and the pixel driving circuit comprises: a light emission control circuit and a drive circuit; wherein the light emission control circuit is coupled to a gate signal terminal, a data signal terminal, a reset signal terminal, an initial power supply terminal, and a control terminal of the drive circuit, and the light emission control circuit is configured to control a potential of the control terminal of the drive circuit based on a gate driving signal provided by the gate signal terminal, a data signal provided by the data signal terminal, a reset signal provided by the reset signal terminal, and an initial power supply signal provided by the initial power supply terminal; and an output terminal of the drive circuit is configured to be coupled to a light-emitting element, and the drive circuit is configured to transmit a light emission driving signal to the light-emitting element based on the potential of the control terminal of the drive circuit, to drive the light-emitting element to emit light;

wherein the drive circuit comprises a first drive transistor and a second drive transistor connected in parallel; and a subthreshold swing of one of the first drive transistor and the second drive transistor is greater than a subthreshold swing of the other one of first drive transistor and the second drive transistor.

8. A method for manufacturing a display panel, applicable to the display panel according to claim 7, the method comprising:

providing a base;

forming an active layer on a side of the base, wherein the active layer comprises a first active layer pattern and a second active layer pattern spaced apart from each other, wherein one of the first active layer pattern and the second active layer pattern belongs to a first drive transistor in the display panel, and the other one of the first active layer pattern and the second active layer pattern belongs to a second drive transistor in the display panel;

forming a first gate insulating layer on a side of the first active layer pattern away from the base, wherein the first gate insulating layer covers the first active layer pattern;

performing plasma treatment on a surface of the second active layer pattern away from the base; and forming a second gate insulating layer on a side of the second active layer pattern away from the base, wherein the second gate insulating layer covers the second active layer pattern and the first gate insulating layer.

9. The method according to claim 8, wherein the first active layer pattern belongs to the first drive transistor in the display panel, and the second active layer pattern belongs to the second drive transistor in the display panel.

10. The method according to claim 8, wherein a thickness of a portion, overlapped with an orthographic projection of the first active layer pattern on the base, of the second gate insulating layer is equal to a thickness of a portion, overlapped with an orthographic projection of the second active layer pattern on base, of the second gate insulating layer.

11. The method according to claim 8, wherein prior to forming the active layer on the side of the base, the method further comprises:

forming a flexible material layer on the side of the base; and forming a first buffer layer on a side of the flexible material layer away from the base;

forming the active layer on the side of the base comprises: forming the active layer on a side of the first buffer layer away from the base.

12. The method according to claim 11, wherein prior to forming the active layer on the side of the first buffer layer away from the base, the method further comprises:

forming a first gate layer on the side of the first buffer layer away from the base; and forming a second buffer layer on a side of the first gate layer away from the first buffer layer, wherein the second buffer layer covers the first gate layer;

forming the active layer on the side of the first buffer layer away from the base comprises:

forming the active layer on a side of the second buffer layer away from the base.

13. The method according to claim 8, wherein after forming the second gate insulating layer on the side of the base, the method further comprises:

forming a second gate layer on a side of the second gate insulating layer away from the base;

forming a first interlayer dielectric layer on a side of the second gate layer away from the second gate insulating layer, wherein the first interlayer dielectric layer covers the second gate layer;

forming a third gate layer on a side of the first interlayer dielectric layer away from the second gate layer;

forming a second interlayer dielectric layer on a side of the third gate layer away from the first interlayer dielectric layer, wherein the second interlayer dielectric layer covers the third gate layer;

forming a source/drain layer on a side of the second interlayer dielectric layer away from the third gate layer, wherein the source/drain layer is coupled to the active layer through a via hole penetrating through the second interlayer dielectric layer, the first interlayer dielectric layer and the gate insulating layer;

forming a planarization layer on a side of the source/drain layer away from the second interlayer dielectric layer;

forming an anode layer on a side of the planarization layer away from the source/drain layer, wherein the anode layer is coupled to the source/drain layer through a via hole penetrating through the planarization layer; and forming a pixel defining layer on a side of the anode layer away from the planarization layer, wherein the pixel defining layer covers the planarization layer and partially exposes the anode layer.

14. The display panel according to claim 7, wherein a gate of the first drive transistor acts as the control terminal of the drive circuit and is coupled to the light emission control circuit, and a gate of the second drive transistor is coupled to the gate of the first drive transistor; and the subthreshold swing of the first drive transistor is greater than the subthreshold swing of the second drive transistor.

15. The display panel according to claim 7, wherein the light emission control circuit comprises: a first reset sub-circuit, a data writing sub-circuit and a compensation control sub-circuit; wherein the first reset sub-circuit is coupled to the reset signal terminal, the initial power supply terminal, and the control terminal of the drive circuit, and the first reset sub-circuit is configured to control connection or disconnection between the initial power supply terminal and the control terminal of the drive circuit in response to the reset signal;

the data writing sub-circuit is coupled to the gate signal terminal, the data signal terminal, and an input terminal of the drive circuit, and the data writing sub-circuit is configured to control connection or disconnection between the data signal terminal and the input terminal of the drive circuit in response to the gate driving signal; and the compensation control sub-circuit is coupled to the gate signal terminal, the output terminal of the drive circuit, and the control terminal of the drive circuit, and the compensation control sub-circuit is configured to control connection or disconnection between the output terminal of the drive circuit and the control terminal of the drive circuit in response to the gate driving signal.

16. The display panel according to claim 15, wherein the light emission control circuit further comprises: a first light emission control sub-circuit, a second light emission control sub-circuit, a second reset sub-circuit and a storage sub-circuit; wherein the first light emission control sub-circuit is coupled to a light emission control terminal, a driving power supply terminal, and the input terminal of the drive circuit, and the first light emission control sub-circuit is configured to control connection or disconnection between the driving power supply terminal and the input terminal of the drive circuit in response to a light emission control signal provided by the light emission control terminal;

the second light emission control sub-circuit is coupled to the light emission control terminal and the output terminal of the drive circuit and is configured to be coupled to the light-emitting element, and the second light emission control sub-circuit is configured to control connection or disconnection between the output terminal of the drive circuit and the light-emitting element in response to the light emission control signal;

the second reset sub-circuit is coupled to the reset signal terminal and the initial power supply terminal and is configured to be coupled to the light-emitting element, and the second reset sub-circuit is configured to control connection or disconnection between the initial power supply terminal and the light-emitting element in response to the reset signal; and the storage sub-circuit is coupled to the driving power supply terminal and the control terminal of the drive circuit, and the storage sub-circuit is configured to store the potential of the control terminal of the drive circuit based on the driving power supply signal.

17. The display panel according to claim 16, wherein the first reset sub-circuit comprises: a first reset transistor; the second reset sub-circuit comprises: a second reset transistor; the data writing sub-circuit comprises: a data writing transistor; the compensation control sub-circuit comprises: a compensation transistor; the first light emission control sub-circuit comprises: a first light emission control transistor; the second light emission control sub-circuit comprises: a second light emission control transistor; and the storage sub-circuit comprises: a storage capacitor; wherein a gate of the first reset transistor and a gate of the second reset transistor are coupled to the reset signal terminal, a first electrode of the first reset transistor and a first electrode of the second reset transistor are coupled to the initial power supply terminal, a second electrode of the first reset transistor is coupled to a control node, and a second electrode of the second reset transistor is configured to be coupled to the light-emitting element;

a gate of the data writing transistor and a gate of the compensation transistor are coupled to the gate signal terminal, a first electrode of the data writing transistor is coupled to the data signal terminal, a second electrode of the data writing transistor is coupled to an input node, a first electrode of the compensation transistor is coupled to the control node, and a second electrode of the compensation transistor is coupled to an output node;

a gate of the first light emission control transistor and a gate of the second light emission control transistor are coupled to the light emission control terminal, a first electrode of the first light emission control transistor is coupled to the driving power supply terminal, a second electrode of the first light emission control transistor is coupled to the input node, a first electrode of the second light emission control transistor is coupled to the output node, and a second electrode of the second light emission control transistor is configured to be coupled to the light-emitting element;

one terminal of the storage capacitor is coupled to the driving power supply terminal, and the other terminal of the storage capacitor is coupled to the control node; and a gate of the first drive transistor is coupled to the control node, a gate of the second drive transistor is coupled to the gate of the first drive transistor, a first electrode of the first drive transistor and a first electrode of the second drive transistor are coupled to the input node, and a second electrode of the first drive transistor and a second electrode of the second drive transistor are coupled to the output node.

18. The display panel according to claim 17, wherein all the transistor in the pixel driving circuit are P-type transistors.

19. A display device, comprising: a power supply assembly, and a display panel; wherein the power supply assembly is coupled to the display panel, and is configured to supply power to the display panel; and the display panel comprises: a base and a plurality of pixels disposed on a side of the base; wherein each of the plurality of pixels comprises a light-emitting element and a pixel driving circuit, the pixel driving circuit being coupled to the light-emitting element, and being configured to drive the light-emitting element to emit light, and the pixel driving circuit comprising: a light emission control circuit and a drive circuit; wherein the light emission control circuit is coupled to a gate signal terminal, a data signal terminal, a reset signal terminal, an initial power supply terminal, and a control terminal of the drive circuit, and the light emission control circuit is configured to control a potential of the control terminal of the drive circuit based on a gate driving signal provided by the gate signal terminal, a data signal provided by the data signal terminal, a reset signal provided by the reset signal terminal, and an initial power supply signal provided by the initial power supply terminal; and an output terminal of the drive circuit is configured to be coupled to a light-emitting element, and the drive circuit is configured to transmit a light emission driving signal to the light-emitting element based on the potential of the control terminal of the drive circuit, to drive the light-emitting element to emit light;

wherein the drive circuit comprises a first drive transistor and a second drive transistor connected in parallel; and a subthreshold swing of one of the first drive transistor and the second drive transistor is greater than a subthreshold swing of the other one of first drive transistor and the second drive transistor.

20. The display device according to claim 19, wherein a gate of the first drive transistor acts as the control terminal of the drive circuit and is coupled to the light emission control circuit, and a gate of the second drive transistor is coupled to the gate of the first drive transistor; and the subthreshold swing of the first drive transistor is greater than the subthreshold swing of the second drive transistor.

* * * * *